(12) United States Patent
Jan et al.

(10) Patent No.: US 10,091,493 B2
(45) Date of Patent: Oct. 2, 2018

(54) DEVICE AND METHOD FOR SCANNING OBJECT OUTLINE IMAGE

(71) Applicant: Metal Industries Research & Development Centre, Kaohsiung (TW)

(72) Inventors: Chia-Ming Jan, Kaohsiung (TW); Chung-Li Tsai, Kaohsiung (TW); Po-Chi Hu, Kaohsiung (TW); Chao-Yung Yeh, Kaohsiung (TW); Chi-Cheng Yang, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 359 days.

(21) Appl. No.: 14/979,976

(22) Filed: Dec. 28, 2015

(65) Prior Publication Data
US 2017/0163968 A1   Jun. 8, 2017

(30) Foreign Application Priority Data

Dec. 3, 2015 (TW) .............................. 104140496 A

(51) Int. Cl.
*H04N 13/25* (2018.01)
*H04N 13/254* (2018.01)
*G01B 11/24* (2006.01)

(52) U.S. Cl.
CPC ........... *H04N 13/254* (2018.05); *G01B 11/24* (2013.01); *H04N 13/25* (2018.05)

(58) Field of Classification Search
CPC ... H04N 13/025; H04N 13/0253; G01B 11/24
USPC ........................................................ 348/47
See application file for complete search history.

(56) References Cited

U.S. PATENT DOCUMENTS

| | | | |
|---|---|---|---|
| 2011/0050854 A1* | 3/2011 | Kanamori | H04N 13/025 348/46 |
| 2011/0144505 A1* | 6/2011 | Yamamoto | A61B 5/0064 600/476 |
| 2012/0069181 A1* | 3/2012 | Xue | G01J 3/0229 348/148 |

* cited by examiner

*Primary Examiner* — Jamie Atala
*Assistant Examiner* — Kathleen Nguyen
(74) *Attorney, Agent, or Firm* — Juan Carlos A. Marquez

(57) ABSTRACT

Device and method for scanning an object outline image are provided. The scanning device includes a light source, an optical sensor and a processor. The scanning method includes: providing a polarized projection light beam; projecting the polarized projection light beam to an object, and correspondingly reflecting a polarized reflection light beam by the object according to the polarized projection light beam; capturing an image of the polarized reflection light beam; calculating polarization state of target according to the polarized projection light beam and the polarized reflection light beam, the polarization state of target having a plane angle from normal projection and a corresponding point position; and restoring an outline image of the object according to the polarization state of target.

6 Claims, 9 Drawing Sheets

DEVICE AND METHOD FOR SCANNING OBJECT OUTLINE IMAGE

CROSS-REFERENCE TO RELATED APPLICATION

This application claims the benefit of Taiwan Patent Application No. 104140496, filed on Dec. 3, 2015, which is hereby incorporated by reference for all purposes as if fully set forth herein.

BACKGROUND

Technical Field

The present invention relates to a scanning device and a scanning method, and in particular, to device and method for scanning an object outline image.

Related Art

As shown in FIG. 1 and FIG. 2, in a prior art of scanning an outline of an object 5, a light beam 6 is projected to the object 5 and an image is captured; however, most of the conventional image capturing methods can merely capture data of a corresponding position of the projection point, cannot capture normal direction data of each corresponding position, and cannot effectively restore the outline of the object 5 and improve the precision thereof.

For example, when the light beam 6 moves to a position L along the scanning direction D (that is, an X axis direction), the outline of the object 5 at the position L may be acquired (as shown in FIG. 2). Only light beam projection direction data of each position in the position L can be acquired (in FIG. 2, the outline captured at the position L is divided into corresponding point positions L1-L12, and the corresponding point positions L1-L12 each have light beam projection direction data n1-n12), in other words, only tri-axial coordinates data (X axis, Y axis and Z axis) of the corresponding point positions L1-L12 may be acquired, but the scanning precision depends on analysis on planar positions, and the lack of normal direction data of each corresponding point of the object 5 results in a rough restored outline of the object 5.

To solve the conventional problem of rough outline, generally, a technology such as interpolation is used to further restore and modify the outline; however, such a processing manner still cannot completely restore the outline 51 of the object precisely.

Therefore, it is needed to provide device and method for scanning an object outline image, so as to effectively solve the foregoing problems.

SUMMARY

A main objective of the present invention is to provide device and method for scanning an object outline image. An outline of an object is scanned by providing a polarized projection light beam including S polarized light and/or P polarized light, so as to obtain the polarization state of target including a corresponding point position (for example, a two-dimensional position) and a plane angle of the object outline from normal projection, thereby obtaining a high-precision object outline image carried with more detailed information.

To achieve the above objective, the present invention provides a method for scanning an object outline image, including: providing a polarized projection light beam; projecting the polarized projection light beam to an object, and correspondingly reflecting a polarized reflection light beam by the object according to the polarized projection light beam; capturing an image of the different polarized reflection light beam; calculating a polarization state of target according to the polarized projection light beam and the polarized reflection light beam, the polarization state of target having a plane angle from normal projection and a corresponding point position, wherein: the plane angle from normal projection is calculated according to the gain ratio of projection polarization angle data of the polarized projection light beam to reflection polarization angle data of the polarized reflection light beam; and by capturing the image of the polarized reflection light beam, the corresponding point position is obtained by using triangulation; and restoring an outline image of the object according to the polarization state of target.

To achieve the above objective, the present invention provides a device for scanning an object outline image, including: a light source configured to provide a polarized projection light beam which is projected to an object, wherein the object correspondingly reflects a polarized reflection light beam according to the polarized projection light beam; an optical sensor, disposed at a path of the polarized reflection light beam, so as to capture an image of the polarized reflection light beam; and a processor electrically connected to the optical sensor, and configured to calculate polarization state of target according to the polarized projection light beam and the polarized reflection light beam, and restore an outline image of the object according to the polarization state of target.

Further, the polarized projection light beam includes S polarized light and/or P polarized light.

Further, when the polarized projection light beam includes the S polarized light, the polarization state of target includes first polarization state data, the plane angle from normal projection includes a first angle, the corresponding point position includes a first position, and a first outline image of the outline image is restored according to the first angle and the first position; and when the polarized projection light beam includes the P polarized light, the polarization state d of target includes second polarization state data, the plane angle from normal projection includes a second angle, the corresponding point position includes a second position, and a second outline image of the outline image is restored according to the second angle and the second position.

Further, when the polarization state of target includes both the first polarization state data and the second polarization state data, the scanning method further includes a step for calculating a third angle according to the first angle and the second angle, so as to restore a third outline image of the outline image.

The present invention is characterized in that: a polarized projection light beam including S polarized light and/or P polarized light is projected to an object, so that the object reflects a polarized reflection light beam including the S polarized light and/or the P polarized light, the first polarization state data including the first angle and the first position is obtained by using the S polarized light, and the first outline image is restored according to the first polarization state data. The second polarization state data including the second angle and the second position may also be obtained by using the P polarized light, and the second outline image is restored according to the second polarization state data. The first outline image and the second outline image can both precisely restore the outline images of the object.

Moreover, the optimal third angle can further be calculated according to the first angle and the second angle, the third polarization state data is obtained, so that the third outline image restored according to the third polarization state data is more fit for the outline image of the object, thereby improving the precision of scanning the object outline.

In order to make the above and other objectives, features and advantages of the present invention clearer, detailed descriptions will be made in the following through accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 3:
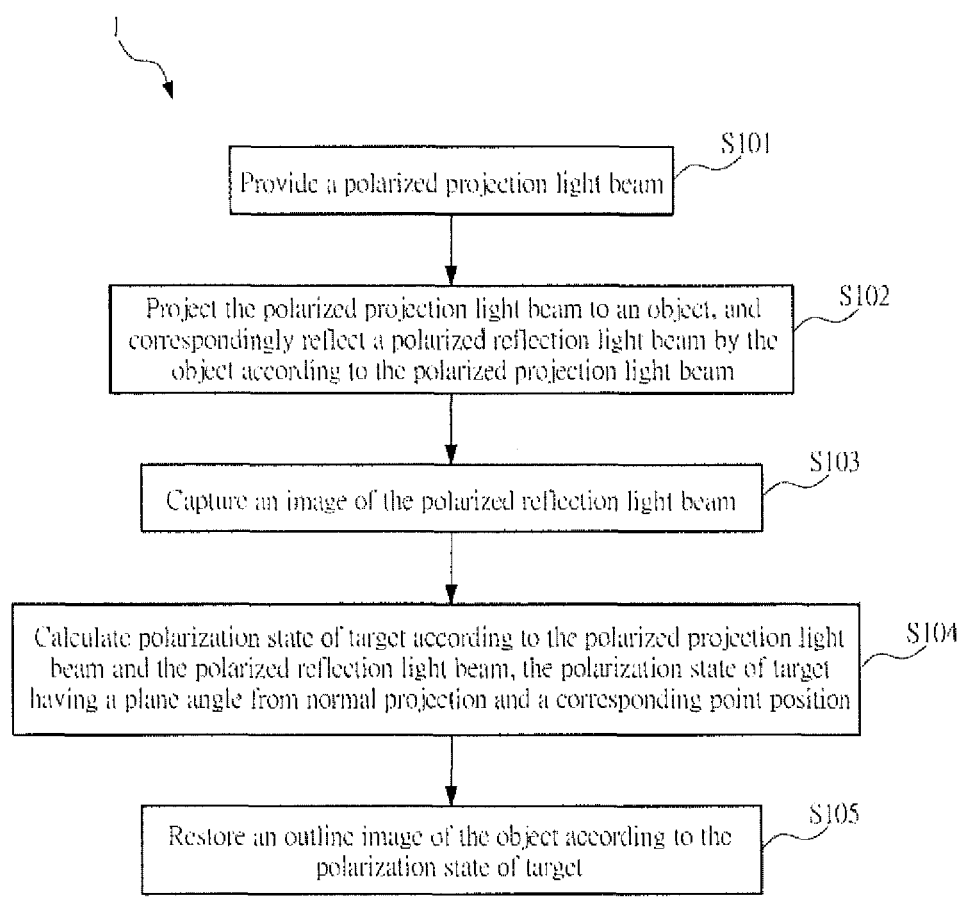
FIG. 3 is a schematic flow chart of a method for scanning an object outline image according to an embodiment of the present invention.
Figure 4:
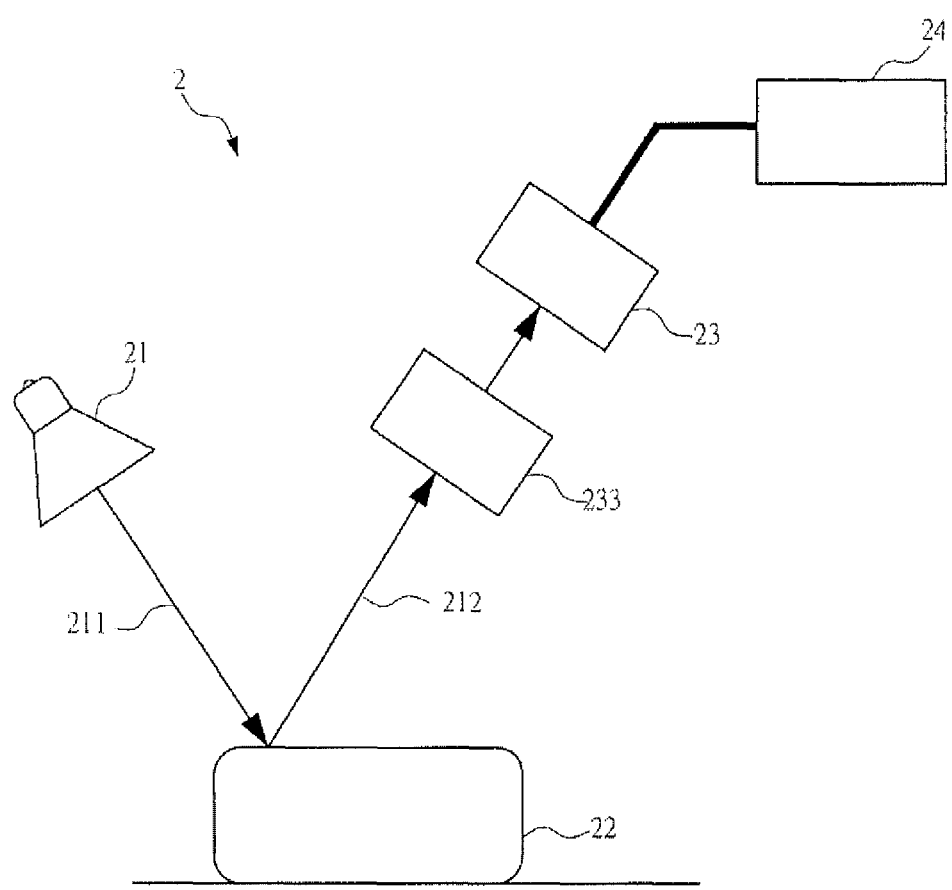
FIG. 4 is a schematic diagram of a device for scanning an object outline image according to an embodiment of the present invention.

FIG. 3 is a schematic flow chart of a method for scanning an object outline image according to an embodiment of the present invention, and FIG. 4 is a schematic diagram of a device for scanning an object outline image according to an embodiment of the present invention.

Referring to FIG. 3 and FIG. 4 together, a method 1 for scanning an object outline image of this embodiment can be applicable to 3D scanning of a three-dimensional object, so as to restore an outline image of the three-dimensional object, and includes the following steps:

Step S101: Provide a polarized projection light beam.

In this embodiment, the polarized projection light beam is provided by a device 2 for scanning an object outline image. Specifically, the device 2 for scanning an object outline image includes: a light source 21, an optical sensor 23 and a processor 24.

The light source 21 is configured to provide the polarized projection light beam 211. The polarized projection light beam 211 includes S polarized light and/or P polarized light, and specifically, the polarized projection light beam 211 may only be the S polarized light, or may only be the P polarized light, or may be polarized light including two polarization states of the S polarized light and the P polarized light.

For example, the S polarized light and the P polarized light may be horizontal polarized light (for example, the P polarized light) and vertical polarized light (for example, the S polarized light) having electric field vibration directions perpendicular to each other and respectively formed by reflection of incident light passing through two polarizers (not shown, for example, linear polarizers). Generation of the S polarized light and P polarized light is the prior art, and is not described in detail herein.

The S polarized light of the polarized projection light beam 211 includes first projection polarization angle data. The P polarized light of the polarized projection light beam 211 includes second projection polarization angle data.

Step S102: Project the polarized projection light beam to an object, and correspondingly reflect a polarized reflection light beam by the object according to the polarized projection light beam.

Specifically, when the polarized projection light beam 211 includes the S polarized light, the polarized projection light beam 211 is projected to an object 22, the object 22 will reflect a polarized reflection light beam 212 corresponding to the polarized projection light beam 211, and the polarized reflection light beam 212 includes the S polarized light. The S polarized light of the polarized reflection light beam 212 includes first reflection polarization angle data.

Similarly, when the polarized projection light beam 211 includes the P polarized light, the polarized projection light beam 211 is projected to an object 22, the object 22 will reflect a polarized reflection light beam 212 corresponding to the polarized projection light beam 211, and the polarized reflection light beam 212 includes the P polarized light. The P polarized light of the polarized reflection light beam 212 includes second reflection polarization angle data.

Step S103: Capture an image of the polarized reflection light beam.

The optical sensor 23 in this embodiment is disposed at a forward path of the polarized reflection light beam 212, and is mainly configured to capture an image of the polarized reflection light beam 212.

The object 22 is a three-dimensional object having multiple surface regions with different slopes, and therefore the polarization direction (that is, the polarization angle) of the polarized reflection light beam 212 can be changed when the polarized reflection light beam 212 obtained by reflecting the polarized projection light beam 211 on the object 22. In order to analyze the polarization direction, the polarization direction of the polarized reflection light beam 212 must be obtained first; in other words, when the polarized reflection light beam 212 includes the S polarized light and the P polarized light, first reflection polarization angle data of the S polarized light and second reflection polarization angle data of the P polarized light must be obtained.

Therefore, the optical sensor 23 includes a polarization analyzing element 233, the polarization analyzing element 233 is a polarization analyzer, which is configured to: when the polarized reflection light beam 212 includes the S polarized light and the P polarized light, detect the first reflection polarization angle data of the S polarized light and the second reflection polarization angle data of the P polarized light.

By using the S polarized light as an example, it is assumed that the light intensity of the S polarized light of the polarized reflection light beam 212 is $I_{in}$, after the S polarized light enters the polarization analyzing element 233, if an angle θ is formed between a polarization direction of the S polarized light and a transmission axis (not shown) of the polarization analyzing element 233, the light intensity of the S polarized light passing through the polarization analyzing element 233 may be calculated $I_{out}=I_{in}\times\cos^2 \theta$, and that is the Malus's Law. It can be known that, when θ=0°, the S polarized light can pass through the polarization analyzing element 233, and in contrast, when θ=90°, the light intensity of the S polarized light passing through the polarization analyzing element 233 is zero. It indicates that the S polarized light cannot pass through the polarization analyzing element 233, and therefore, the polarization direction of the S polarized light may be detected by rotating the polarization analyzing element 233.

Step S104: Calculate polarization state of target according to the polarized projection light beam and the polarized reflection light beam, the polarization state of target having a plane angle from normal projection and a corresponding point position, wherein; the plane angle from normal projection is calculated according to a gain ratio of projection polarization angle data of the polarized projection light beam to reflection polarization angle data of the polarized reflection light beam; and by capturing the image of the polarized reflection light beam, the corresponding point position (for example, a two-dimensional position) is obtained by using triangulation.

After the optical sensor 23 captures the image of the polarized reflection light beam 212, when the polarized reflection light beam 212 includes the S polarized light, the processor 24 can obtain the first reflection polarization angle data, and when the polarized reflection light beam 212 includes the P polarized light, the processor 24 can obtain the second reflection polarization angle data. If the polarized reflection light beam 212 includes both the S polarized light and the P polarized light, the processor 24 can obtain the first reflection polarization angle data and the second reflection polarization angle data.

Moreover, when the polarized projection light beam 211 includes the S polarized light, the polarization state of target includes first polarization state data, so that the plane angle from normal projection includes a first angle, and the corresponding point position includes a first position, that is, the first polarization state data includes the first angle and the first position, and a first outline image of the outline image is restored according to the first angle and the first position. When the polarized projection light beam includes the P polarized light, the polarization state of target includes a second polarization state data, so that the plane angle from normal projection includes a second angle, and the corresponding point position includes a second position, that is, the second polarization state data includes the second angle and the second position, and a second outline image of the outline image is restored according to the second angle and the second position.

The method of calculating the first position and the second position is a triangulation method (that is, triangulation) using a conventional geometrical relationship based on a lens imaging characteristic for object thickness measurement and outline sketching. A basic measurement principle of the triangulation method is that a light beam is used to project a light spot or straight line on a surface of an object, a projected stripe will be distorted according to fluctuation and curvature of an outline surface, an image of the beam (that is, a reflected polarized light beam) is captured by using an optical sensor, and data such as a distance of a to-be-measured point and coordinates of a corresponding point position may be obtained by using a triangular geometry relationship, thereby calculating coordinates (x, y, z) of the first position and the second position. The triangulation method is a prior art, and is not described in detail herein.

In this embodiment, when the polarization state of target includes the first polarization state data, the scanning method further includes: a step for calculating the first angle according to a first gain ratio of the first projection polarization angle data of the polarized projection light beam to the first reflection polarization angle data of the polarized reflection light beam. When the polarization state of target includes the second polarization state data, the scanning method further includes: a step for calculating the second angle according to a second gain ratio of the second projection polarization angle data of the polarized projection light beam to the second reflection polarization angle data of the polarized reflection light beam.

Figure 5:
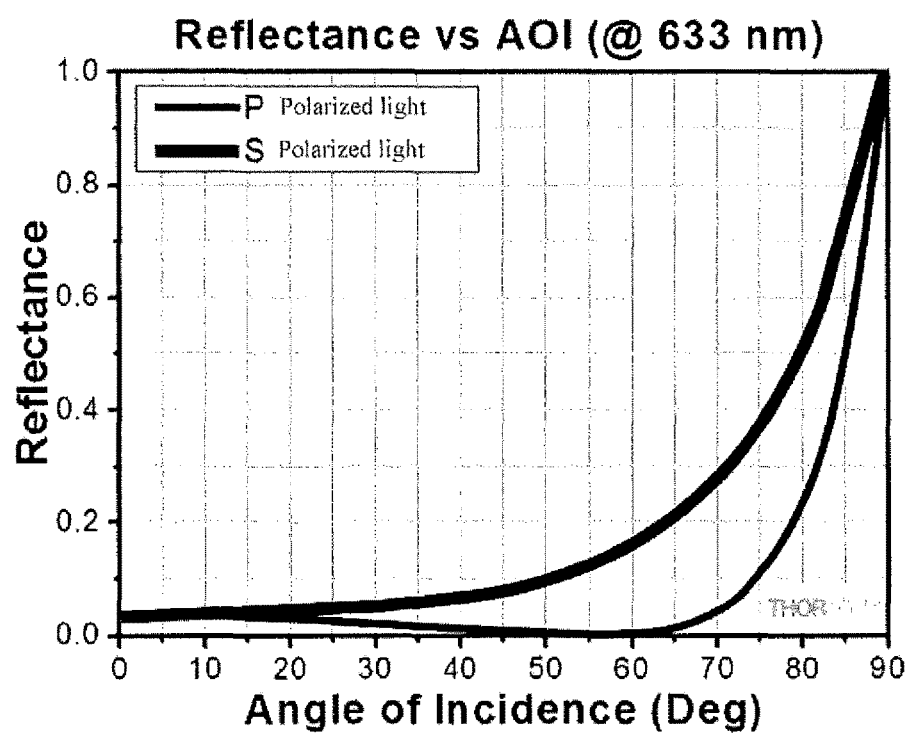
FIG. 5 is a correspondence diagram of a reflectance and an angle of incidence of S polarized light and P polarized light according to the present invention.
Figure 6A:
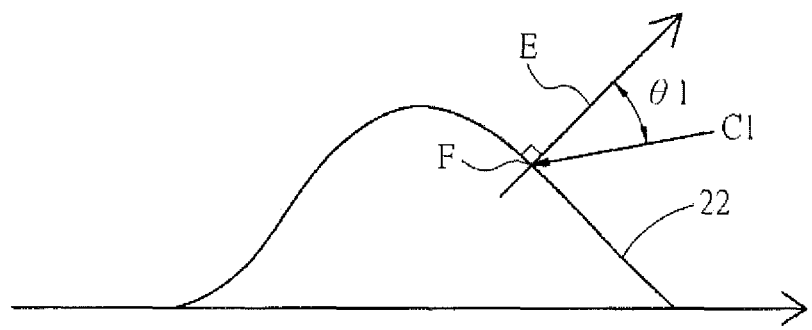
FIG. 6a is a schematic diagram of an angle of incidence formed by S polarized light and a normal of the object according to the present invention.

Specifically, in the manner of calculating the first angle in this embodiment, the processor 24 is mainly used to calculate a first gain ratio (for example, a light intensity gain ratio) of the first projection polarization angle data of the S polarized light of the polarized projection light beam 211 to the first reflection polarization angle data of the S polarized light of the polarized reflection light beam 212, so as to obtain the first angle by conversion. For example, as shown in FIG. 5, in a case that light wavelengths of the polarized projection light beam 211 and the polarized reflection light beam 212 are set to 633 nm, it is assumed that light intensity of the polarized projection light beam 211 is $I_{s\_in}$, and a polarization angle of the S polarized light thereof is $\theta_{s1}$. It is further assumed that light intensity for obtaining the polarized reflection light beam is $I_{s\_out}$, and a polarization angle of S polarized light is $\theta_{s2}$. In this case, a light intensity gain of the S polarized light of the polarized projection light beam 211 may be calculated as $I_{s\_in} \cos \theta_{s1}$, a light intensity gain of the S polarized light of the polarized reflection light beam 212 may be calculated as $I_{s\_out} \cos \theta_{s2}$; therefore, the first gain ratio (the light intensity gain ratio, that is, a reflectance in FIG. 5) may be obtained according to a ratio of the light intensity gain of the S polarized light of the polarized projection light beam 211 to the light intensity gain of the S polarized light of the polarized reflection light beam 212. When the first gain ratio is 0.4, the first angle θ1 (that is, an angle of incidence in FIG. 5) is about 76 degrees. As shown in FIG. 6a, the first angle θ1 is an angle formed by S polarized light C1 projected by the object 22 at a certain corresponding point position F and a normal E of the corresponding point position F.

Figure 6B:
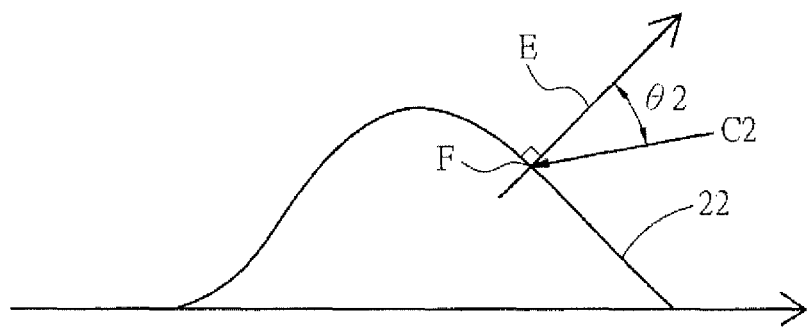
FIG. 6b is a schematic diagram of an angle of incidence formed by P polarized light and a normal of the object according to the present invention.

In the manner of calculating the second angle, the processor 24 is mainly used to calculate a second gain ratio (for example, a light intensity gain ratio) of the second projection polarization angle data to the second reflection polarization angle data of the P polarized light of the polarized projection light beam 211, so as to obtain the second angle by conversion. For example, as shown in FIG. 5, in a case that light wavelengths of the polarized projection light beam 211 and the polarized reflection light beam 212 are set to 633 nm, it is assumed that light intensity of the polarized projection light beam 211 is $I_{p\_in}$, and a polarization angle of P polarized light thereof is $\theta_{p1}$. It is further assumed that light intensity for obtaining the polarized reflection light beam is $I_{p\_out}$, and a polarization angle of P polarized light thereof is $\theta_{p2}$. In this case, a light intensity gain of the P polarized light of the polarized projection light beam 211 may be calculated as $I_{p\_in} \cos \theta_{p1}$, a light intensity gain of the P polarized light the polarized reflection light beam 212 may be calculated as $I_{p\_out} \cos \theta_{p2}$; therefore, the second gain ratio (the light intensity gain ratio, that is, a reflectance in FIG. 5) may be obtained according to a ratio of the light intensity gain of the P polarized light of the polarized projection light beam 211 to the light intensity gain of the P polarized light of the polarized reflection light beam 212. When the second gain ratio is 0.1, the second angle θ2 (that is, an angle of incidence in FIG. 5) is about 75 degrees. As shown in FIG. 6b, the second angle θ2 is an angle formed by P polarized light C2 projected by the object 22 at a certain corresponding point position F and a normal E of the corresponding point position F.

Figure 7:
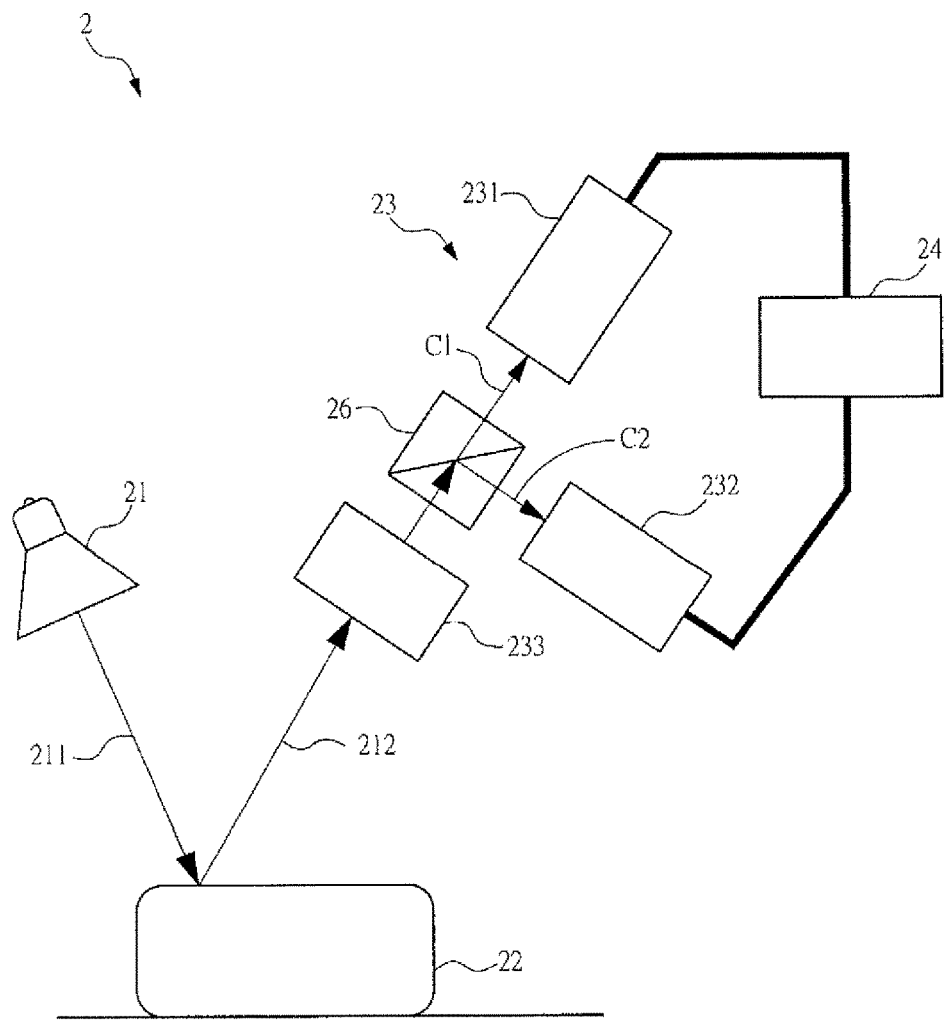
FIG. 7 is a schematic diagram of a device for scanning an object outline image according to another embodiment of the present invention.

In another embodiment, as shown in FIG. 7, when the polarized projection light beam 211 and the corresponding polarized reflection light beam 212 both include the S polarized light C1 and the P polarized light C2, for ease of the optical sensor 23 to distinguish and capture images of the S polarized light C1 and the P polarized light C2, the device 2 for scanning an object outline image can further include: an optical splitting element 26, a first photosensitive element 231 and a second photosensitive element 232.

The optical splitting element 26 can be a spectroscope, which is configured to split the S polarized light and the P polarized light of the polarized reflection light beam 212 into two light beams having forward directions perpendicular to each other. The first photosensitive element 231 and the second photosensitive element 232 are optical sensors, and are configured to capture images of the S polarized light C1 and the P polarized light C2 respectively, so that the processor 24 calculates the first angle, the first position, the second angle and the second position.

Step S105: Restore an outline image of the object according to the polarization state of target.

The processor 24 may have built-in image processing software or may be externally connected to an image processor, so as to draw the first outline image and the second outline image corresponding to the object 22 respectively according to the first polarization state data and the second polarization state data.

Figure 1:
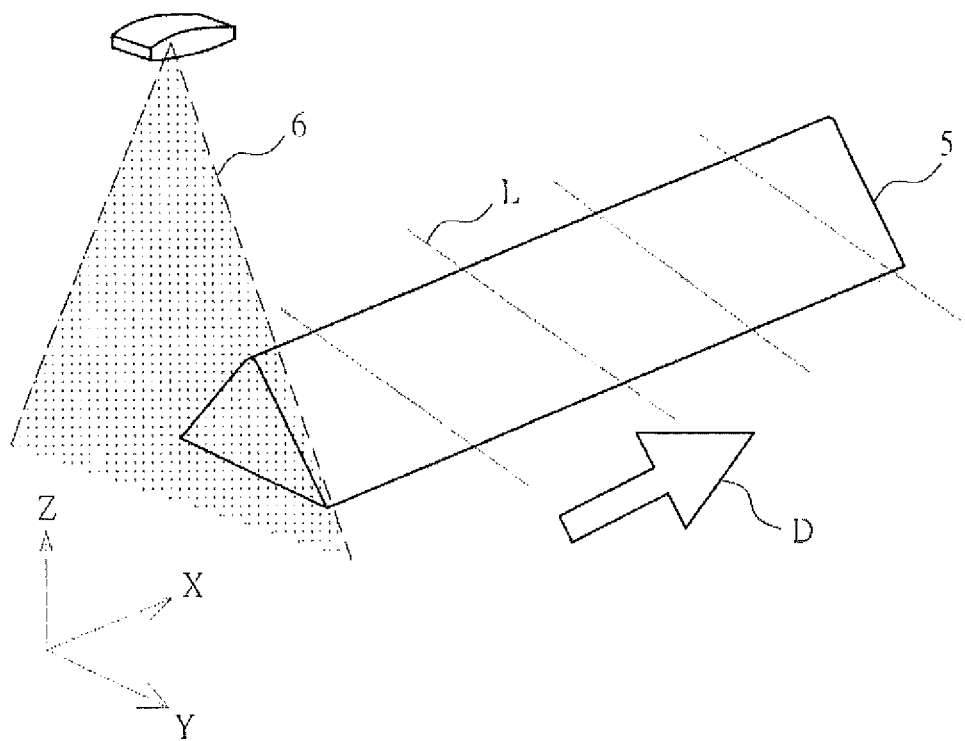
FIG. 1 is a schematic diagram of scanning an object outline in the prior art.
Figure 2:
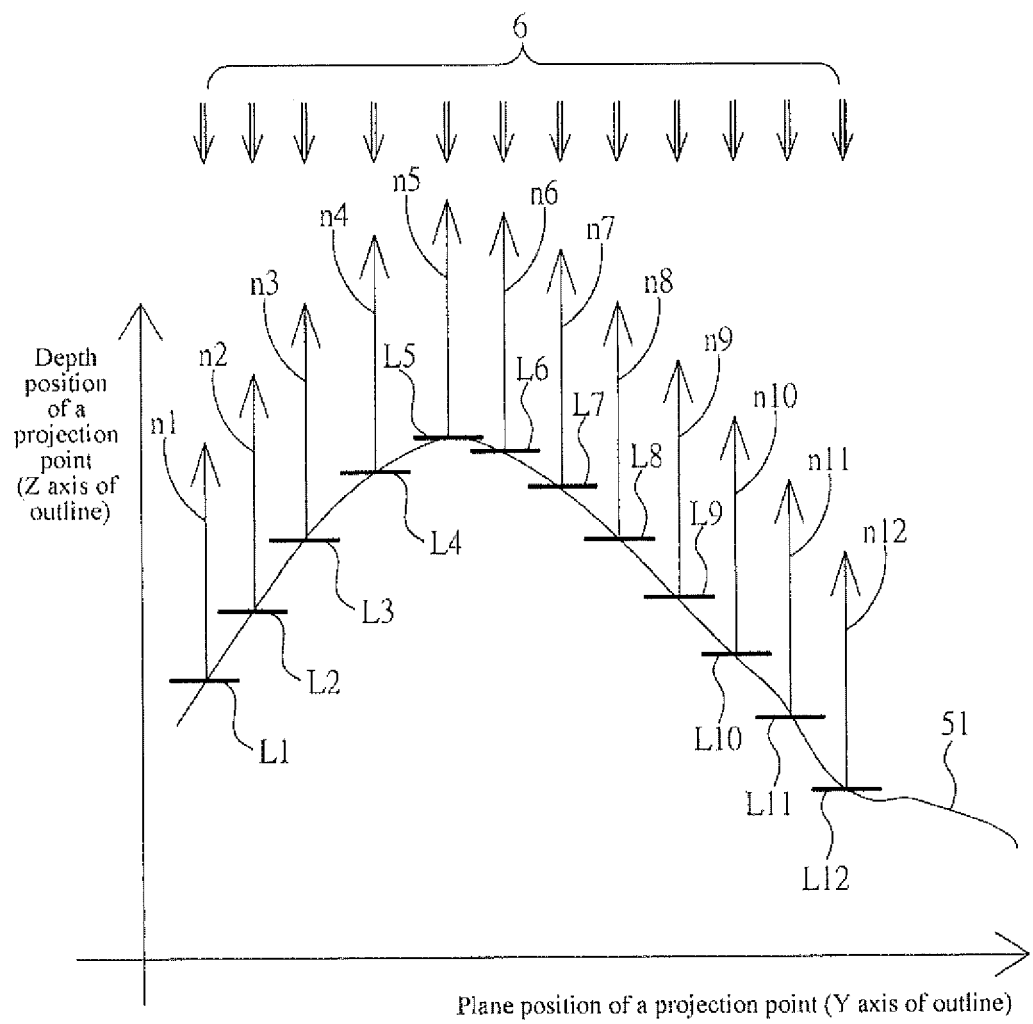
FIG. 2 is a schematic diagram of restoring an object outline in the prior art.
Figure 8:
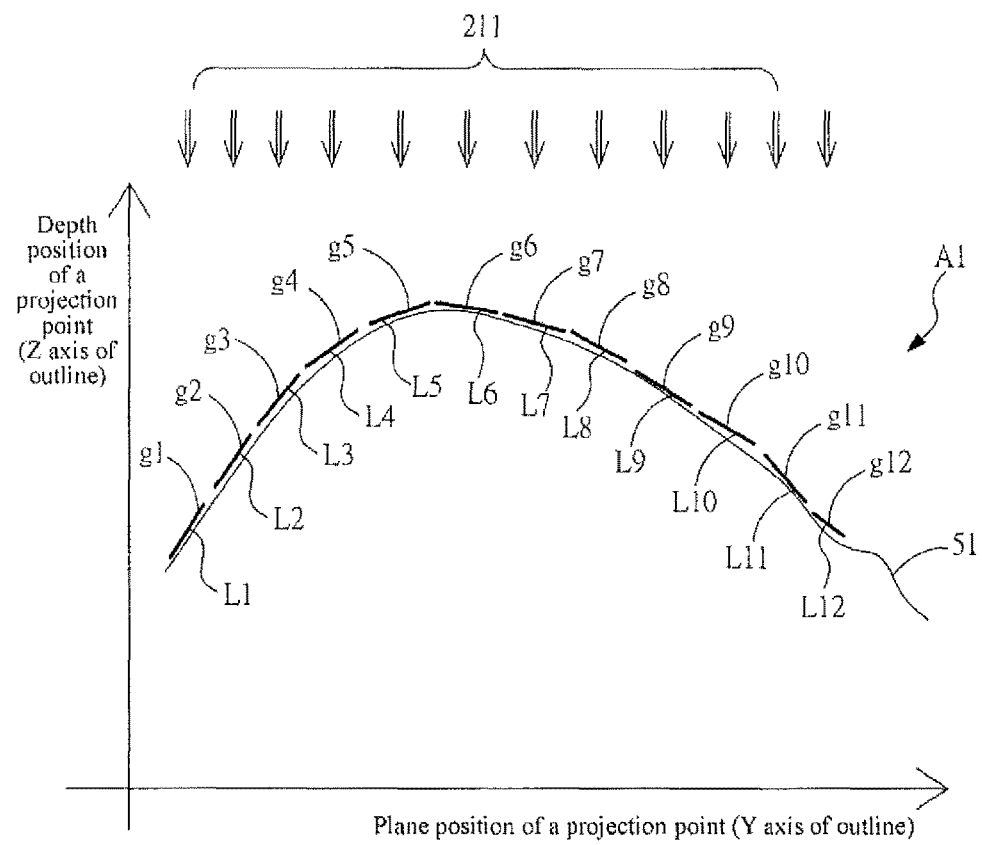
FIG. 8 is a schematic diagram of restoring an object outline according to the present invention.

For example, if the S polarized light of the polarized projection light beam 211 of this embodiment is projected to the corresponding point position L of the object 5 in FIG. 1, the processor 24 can calculate the first polarization state data including the first angle and the first position, so that the processor 24 or the external image processor draws a first outline A1 (as shown in FIG. 8) according to the first polarization state data. It can be seen that corresponding point positions L1-L12 of the first outline A1 each have respective tangential direction data, so that the first outline A1 can precisely restore the object outline 51. For example, as shown in FIG. 6a, for the tangential direction data, the normal E of the first position may be calculated according to the first angle θ1 and the first position F, thereby obtaining the tangential direction data of the first position F.

Figure 9:
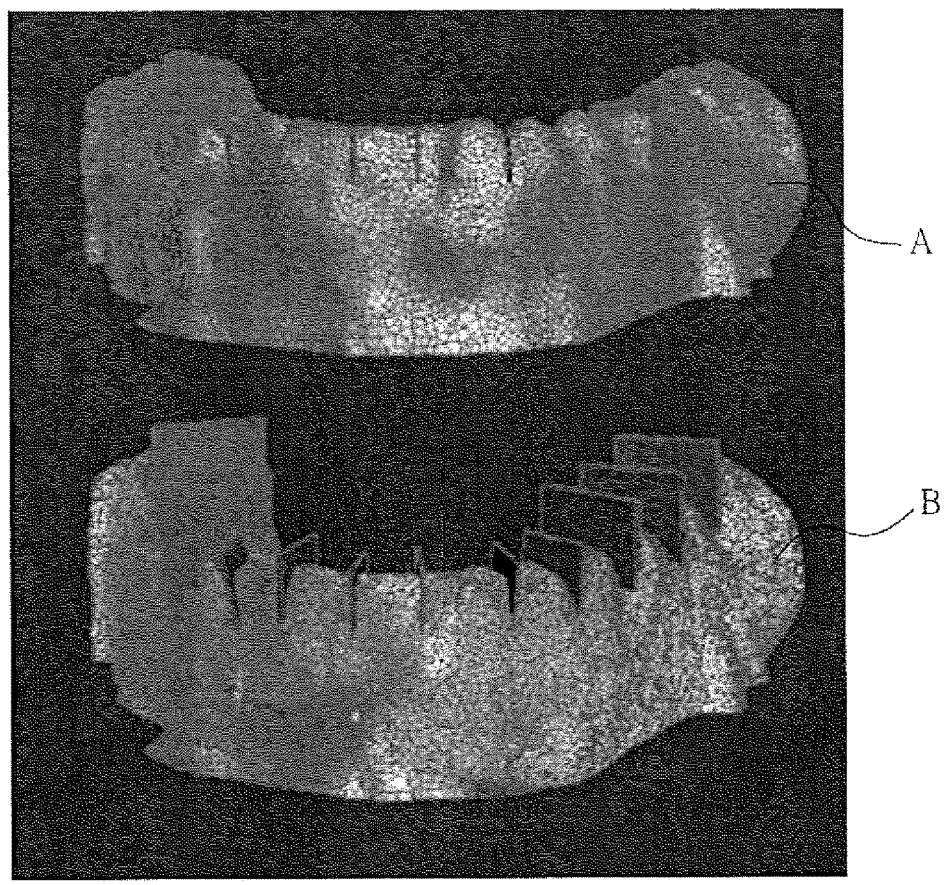
FIG. 9 is a schematic diagram of a first outline image and a third outline image restored when the present invention is applied to scan an oral cavity.

For another example, as shown in FIG. 9, the first outline image A is shown as an outline image corresponding to the first polarization state data drawn by actually scanning gums in an oral cavity.

In another embodiment, when the polarization state of target includes both the first polarization state data and the second polarization state data, the processor 24 can calculate a third angle according to the first angle and the second angle, so as to restore a third outline image of the outline image. Specifically, in order to obtain more precise normal plane angle data of a surface outline of the object 22, a technology such as averaging or interpolation may be performed on the first angle of the S polarized light and the second angle of P polarized light to calculate the optimal third angle, so that a third outline image B drawn by using the polarization state of target including the third angle is more fit for the outline image of the object, as shown in FIG. 9.

Therefore, in the present invention, a polarized projection light beam including S polarized light and/or P polarized light is projected to an object, the object reflects a polarized reflection light beam including the S polarized light and/or the P polarized light, the first polarization state data including a first angle and a first position is obtained by using the S polarized light, and a first outline image is restored according to the first polarization state data. The second polarization state data including a second angle and a second position can also be obtained by using the P polarized light, and a second outline image is restored according to the second polarization state data. The first outline image and the second outline image both can precisely restore the outline images of the object.

Moreover, the optimal third angle can further be calculated according to the first angle and the second angle, and the third polarization state data is obtained, so that the third outline image restored according to the third polarization state data is more fit for the outline image of the object, so as to improve the precision of scanning the object outline.

In view of the above, implementation manner or embodiments of technical measures used for solving the problems in the present invention are recorded, and they are not intended to limit the implementation scope of the present invention. Equivalent variations and modifications made without departing from the spirit of the claims of the present invention or made according to the patent scope of the present invention shall all fall within the scope of the present invention.

What is claimed is:

1. A method for scanning an outline image, comprising:
providing a polarized projection light beam;
projecting the polarized projection light beam to an object, and correspondingly reflecting a polarized reflection light beam by the object according to the polarized projection light beam;
capturing an image of the polarized reflection light beam;
calculating a polarization state of target according to the polarized projection light beam and the polarized reflection light beam, the polarization state of target having a plane angle from normal projection and a corresponding point position, wherein:
the plane angle from normal projection is calculated according to a gain ratio of projection polarization angle data of the polarized projection light beam to reflection polarization angle data of the polarized reflection light beam; and
by capturing the image of the polarized reflection light beam, the corresponding point position is obtained by using triangulation;
restoring an outline image of the object according to the polarization state of target,
wherein the polarized projection light beam comprises S polarized light and/or P polarized light;
when the polarized projection light beam comprises the S polarized light, the polarization state of target comprises first polarization state data, the plane angle from normal projection comprises a first angle, the corresponding point position comprises a first position, and a first outline image of the outline image is obtained according to the first angle and the first position;

when the polarized projection light beam includes the P polarized light, the polarization state of target comprises second polarization state data, the plane angle from normal projection comprises a second angle, the corresponding point position comprises a second position, and a second outline image of the outline image is restored according to the second angle and the second position; and when the polarization state of target comprises both the first polarization state data and the second polarization state data, calculating a third angle according to the first angle and the second angle, so as to restore a third outline image of the outline image.

2. The method for scanning an object outline image according to claim 1, wherein the gain ratio of the projection polarization angle data to the reflection polarization angle data is a light intensity gain ratio.

3. The method for scanning an object outline image according to claim 1, wherein:

when the polarization state of target comprises the first polarization state data, the scanning method further comprises: a step for calculating the first angle according to a first gain ratio of first projection polarization angle data of the polarized projection light beam to first reflection polarization angle data of the polarized reflection light beam; and when the polarization state of target comprises the second polarization state data, the scanning method further comprises: a step for calculating the second angle according to a second gain ratio of second projection polarization angle data of the polarized projection light beam to second reflection polarization angle data of the polarized reflection light beam.

4. A device for scanning an object outline image, comprising:

a light source, configured to provide a polarized projection light beam which is projected to an object, wherein the object correspondingly reflects a polarized reflection light beam according to the polarized projection light beam;

an optical sensor, disposed at a path of the polarized reflection light beam, so as to capture an image of the polarized reflection light beam; and a processor, electrically connected to the optical sensor, and configured to calculate polarization state of target according to the polarized projection light beam and the polarized reflection light beam, and restore an outline image of the object according to the polarization state of target, wherein the polarization state of target having a plane angle from normal projection and a corresponding point position;

wherein the polarized projection light beam comprises S polarized light and/or P polarized light when the polarized projection light beam comprises the S polarized light, the polarization state of target comprises first polarization state data, the plane angle from normal projection comprises a first angle, the corresponding point position comprises a first position, and a first outline image of the outline image is obtained according to the first angle and the first position;

when the polarized projection light beam includes the P polarized light, the polarization state of target comprises second polarization state data, the plane angle from normal projection comprises a second angle, the corresponding point position comprises a second position, and a second outline image of the outline image is restored according to the second angle and the second position; and when the polarization state of target comprises both the first polarization state data and the second polarization state data, the processor being further configured to calculate a third angle according to the first angle and the second angle, so as to restore a third outline image of the outline image.

5. The device for scanning an object outline image according to claim 4, wherein the optical sensor comprises a polarization analyzing element;

when the polarized reflection light beam comprises the S polarized light, the polarization analyzing element is configured to detect the first reflection polarization angle data; and when the polarized reflection light beam comprises the P polarized light, the polarization analyzing element is configured to detect the second reflection polarization angle data.

6. The device for scanning an object outline image according to claim 5, wherein when the polarized projection light beam comprises both the S polarized light and the P polarized light, the optical sensor further comprises:

a spectroscope, configured to split the S polarized light and the P polarized light of the polarized reflection light beam into two light beams having forward directions perpendicular to each other;

a first photosensitive element, configured to capture an image of the S polarized light; and a second photosensitive element, configured to capture an image of the P polarized light.

* * * * *